United States Patent [19]
Chi

[11] Patent Number: 5,823,556
[45] Date of Patent: Oct. 20, 1998

[54] HEAD SET FOR A BICYCLE

[76] Inventor: Yi-Chen Chi, No. 139-5, An Mei Rd., Mei Shan Village, Houli Hsiang, Taichung Hsien, Taiwan

[21] Appl. No.: 876,498
[22] Filed: Jun. 16, 1997
[51] Int. Cl.$^6$ ....................................................... B62K 1/00
[52] U.S. Cl. ........................... 280/279; 403/367; 384/545
[58] Field of Search .................................... 280/279, 280; 403/367, 365, 368, 370; 384/545, 537

[56] References Cited

U.S. PATENT DOCUMENTS

| | | | |
|---|---|---|---|
| 4,466,629 | 8/1984 | Sinyard | 280/279 |
| 5,319,993 | 6/1994 | Chiang | 280/279 X |
| 5,680,798 | 10/1997 | Luen | 280/279 X |

Primary Examiner—Robert J. Oberleitner
Assistant Examiner—Tyrone M. Lee
Attorney, Agent, or Firm—Dellett and Walters

[57] ABSTRACT

A head set disposed at each one of two ends of a head tube of a bicycle includes a bowl member having a neck portion inserted into the head tube and a skirt portion with a first groove defined therein, a ring member force-fitted into said neck portion, a plurality of balls received in the first groove, an annular member having a second groove defined therein so that the balls are rotatably received between the first groove and the second groove, and a race member engaging with and positioning the annular member. The ring member has a first flange and the race member has a second flange which is overlappingly disposed with the first flange in a longitudinal direction of the head set.

3 Claims, 5 Drawing Sheets

HEAD SET FOR A BICYCLE

BACKGROUND OF THE INVENTION

1. Field of the Invention

The present invention relates to a head set for a bicycle and which has balls received between a bowl member and an annular member which is disposed between the balls and an upper race and is positioned by a ring member fixedly connected to the bowl member so that a deformation of the upper race is prevented because no heat treatment process is applied to the upper race.

2. Brief Description of the Prior Art

FIG. 1 shows a conventional upper head set 30 and a conventional lower head set 40 for a bicycle and which are respectively disposed at two ends of a head tube 50 of a bicycle. A steering tube 51 is inserted through the two head sets 30, 40 and threadedly engaged with an upper race 32 and an adjusting nut 34. The upper head set 30 is similar in structure to the lower head set 40 and includes the upper race 32, a bearing set 33 and a bowl member 31 which has a first neck portion 311 inserted into the head tube 50 and a skirt portion having a curved inner periphery 312. The upper race 32 has a second neck portion with a groove 322 defined in an lower edge thereof so that the bearing set 33 is rotatably received between the curved inner periphery 312 and the groove 322. The upper race 32 further has an inner threaded periphery 323 defined therein so as to threadedly connect to the steering tube 51. In order to stiffen an outer surface defining the groove 322, a heat treatment process is applied to the whole upper race 32 so that the outer surface 322 of the upper race 32 is tough enough to roll on the bearing set 33 whenever the bicycle is turned.

However, the inner threaded periphery 323 of the upper race 32 is defined before the heat treatment process is applied so that the inner threaded periphery 323 will be slightly deformed during the heat treatment process. The slightly deformed inner threaded periphery 323 results in an uneven contact between the bearing set 33 and the outer surface of the groove 322 and thus increases potential damage on the bearing set 33 and the outer surface of the groove 322. Furthermore, the slightly deformed upper race 32 will damage an outer threaded periphery of the steering tube 51 because the material of the steering tube 51 is softer than of the stiffened upper race 32. When assembling the upper head set 30, it is found that the bearing set 33 could be disposed in an incorrect manner such as the bearing set 33 shown in FIG. 2 (the correct orientation would be to turn the bearing set over), especially when a user wants to assemble it by him/herself.

The present invention intends to provide an improved head set to mitigate and/or obviate the above-mentioned problems.

SUMMARY OF THE INVENTION

The present invention provides a head set which is disposed at each one of two ends of a head tube of a bicycle and comprises a bowl member having a first neck portion inserted into said head tube and a skirt portion with a first groove defined in an inner periphery thereof, a ring member having a flange extending radially from a first end thereof and being force-fitted with an inner periphery of said first neck portion by a second end thereof, and an annular member having a second groove defined therein and a second flange extending radially from an edge thereof so that a plurality of balls are rotatably received between said first groove and said second groove wherein the annular member is positioned by a race member. The first flange and said second flange overlap with each other in a longitudinal direction of said head set.

It is an object of the present invention to provide a head set which has an annular member disposed between the ball bearing and a race member and doesn't require heat treatment to be manufactured.

It is another object of the present invention to provide a head set wherein the ball bearings can not be disposed in an incorrect manner.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
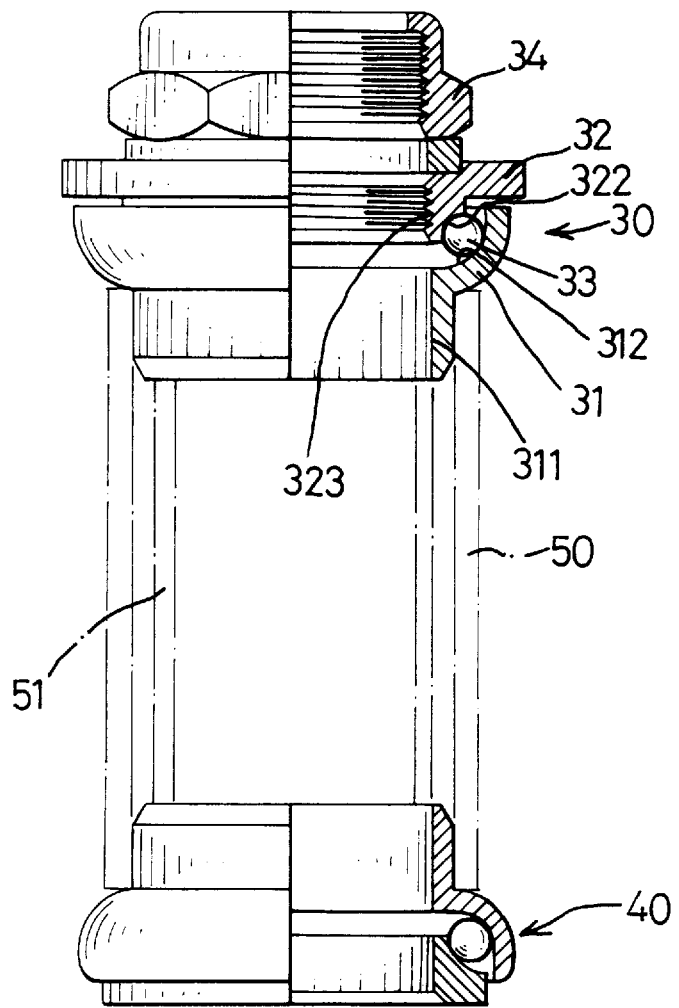
FIG. 1 is a side elevational view, partly in section, of two conventional head sets disposed at two ends of a head tube.
Figure 2:
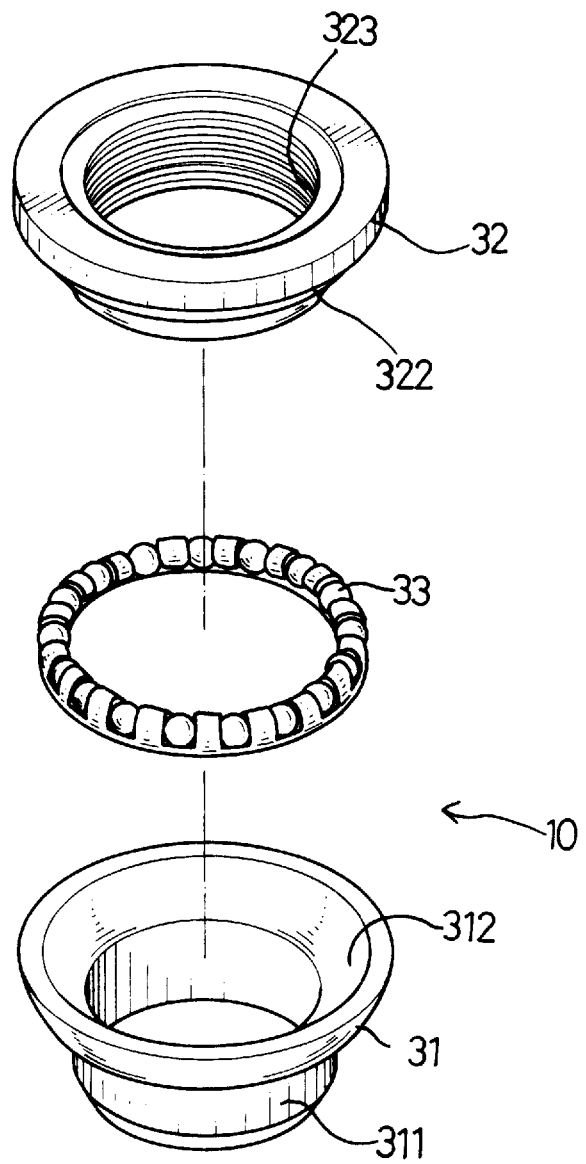
FIG. 2 is an exploded view of an upper race, a bowl member and a bearing set in an incorrect orientation of the conventional head set.
Figure 3:
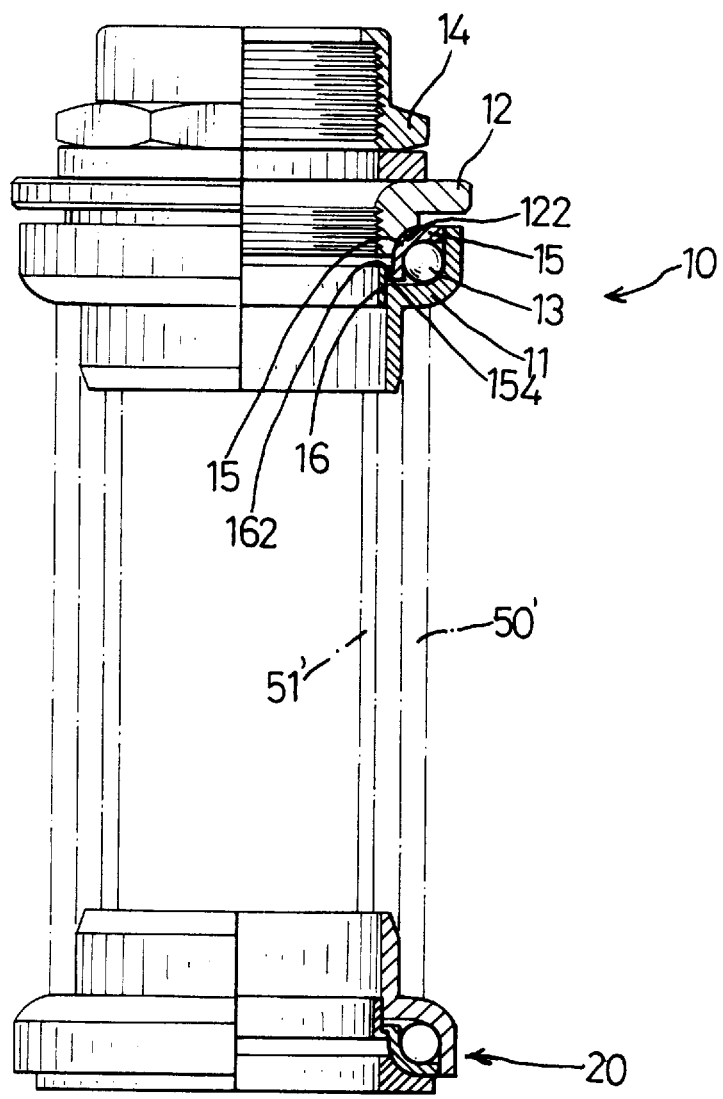
FIG. 3 is a side elevational view, partly in section, of two head sets in accordance with the present invention disposed at two ends of a head tube.
Figure 4:
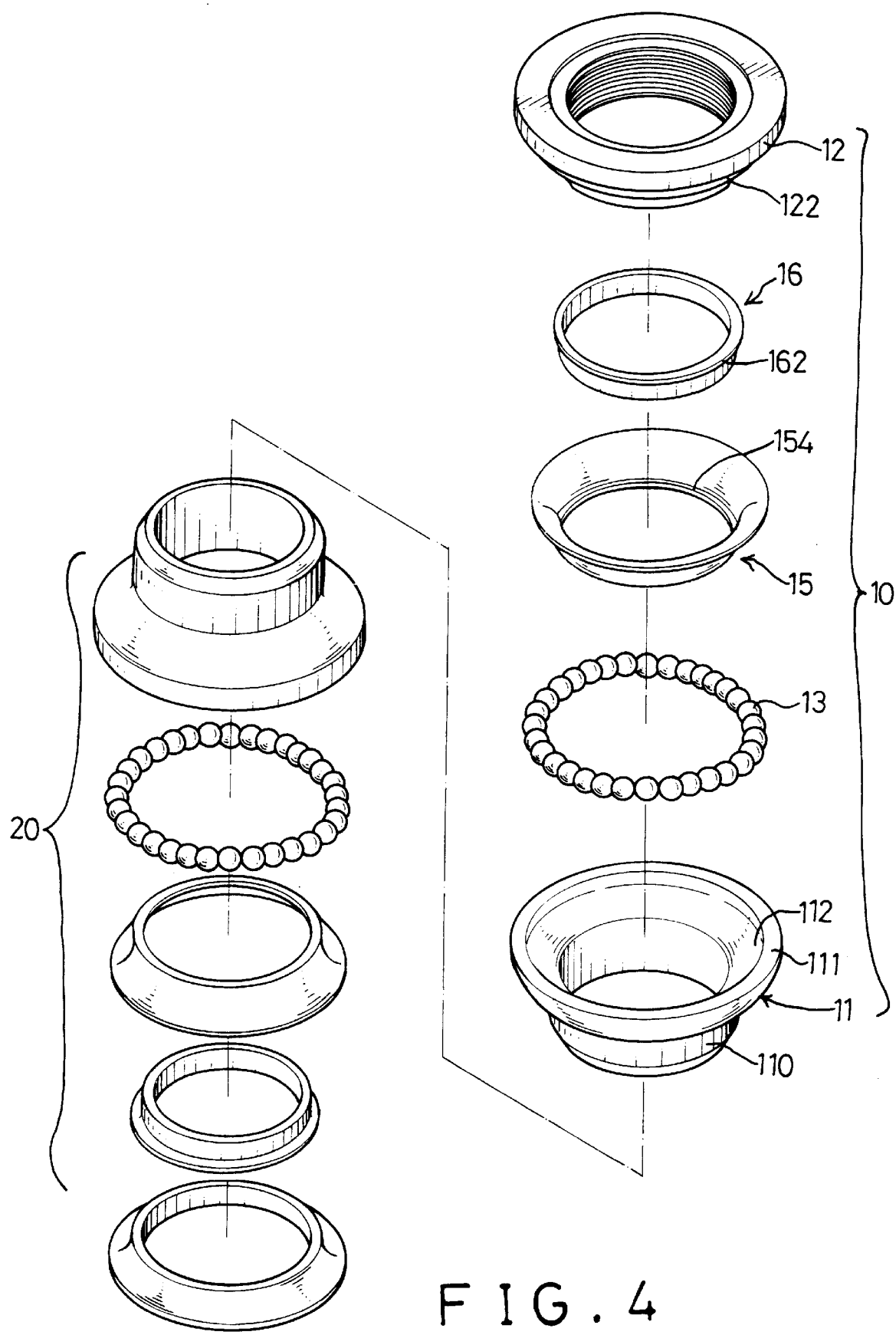
FIG. 4 is an exploded view of an upper head set in accordance with the present invention.
Figure 5:
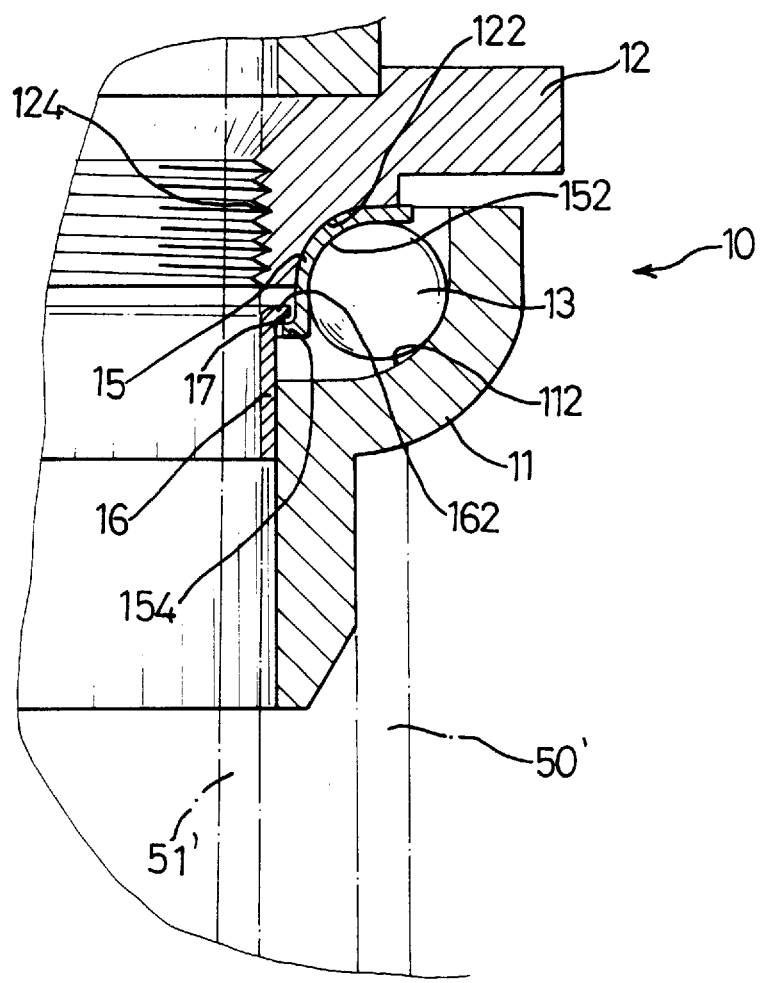
FIG. 5 is a large-scale side elevational view, partly in section, of an engagement of the upper head set in accordance with the present invention.

Referring to FIGS. 3 through 5, a head set in accordance with the present invention is disposed at each one of two ends of a head tube 50' of a bicycle.

An upper head set 10 comprises a bowl member 11 having a neck portion 110 inserted into said head tube 50' and a skirt portion 111 extending radially and upwardly from an upper edge of the neck portion 110 wherein a first groove 112 is defined in an inner periphery of said skirt portion 111.

A ring member 16 made of a metal plate, such as steel or another metal which has been heat treated, has a first flange 162 extending radially to a first end thereof which extends from said neck portion 110. The ring member 16 being force-fitted with an inner periphery of said neck portion 110 by a second end thereof so that the ring member 16 is fixedly connected to the bowl member 11.

A plurality of balls 13 are received in said first groove 112.

An annular member 15 has a second groove 152 defined in an underside thereof and a second flange 154 extending radially from a lower edge thereof so that said balls 13 are rotatably received between said first groove 112 and said second groove 152.

A race member 12 has a third groove 122 defined in a lower edge thereof and has an inner threaded periphery 124 defined therein so as to threadedly connect to a steering tube 51'. The race member 12 is securely positioned by a well-known adjusting nut 14 mounted to the steering tube 51' so that the said annular member 15 is securely received in said third groove 122. The first flange 162 and said second flange 154 overlap each other in a longitudinal direction of said head set and an annular gap 17 is defined between said first flange 162 and said second flange 154 so that the annular member 15 freely rotates around the steering tube 51'.

Accordingly, because the balls 13 are received between the annular member 15 and the bowl member 11, the race member 12 does not require heat treatment. Furthermore, the balls 13 are simply arranged within the first groove 112 of the bowl member 11 and are retained by the annular member 15 which is limited from being separated from the balls 13 by the first flange 162 and the second flange 154. The annular member 15 and the ring member 16 are made of a steel plate which is easily and inexpensively manufactured so that the whole manufacturing cost of the head set of the present invention is reduced.

It should be noted that a lower head set 20 has a similar structure to that of the upper head set 10 as described hereinbefore.

Although the invention has been explained in relation to its preferred embodiment, it is to be understood that many other possible modifications and variations can be made without departing from the spirit and scope of the invention as hereinafter claimed.

What is claimed is:

1. A head set disposed at each one of two ends of a head tube of a bicycle, comprising:

a bowl member having a neck portion inserted into said head tube and said neck portion having a skirt portion extending radially and upwardly from an upper edge thereof so as to define a first groove in an inner periphery of said skirt portion;

a ring member having a first flange extending radially from a first end thereof which extends from said neck portion, said ring member being force-fitted with an inner periphery of said neck portion by a second end thereof;

a plurality of balls received in said first groove;

an annular member having a second groove defined therein and a second flange extending radially from an edge thereof so that said balls are rotatably received between said first groove and said second groove, and a race member having a third groove defined therein and being securely positioned to receive said annular member in said third groove, wherein said first flange and said second flange overlap each other in a longitudinal direction of said head set.

2. The head set as claimed in claim 1 wherein said race member has an inner threaded periphery defined therein.

3. The head set as claimed in claim 1 wherein an annular gap is defined between said first flange and said second flange.

* * * * *